(12) United States Patent
Kurihara (10) Patent No.: US 11,553,152 B2
(45) Date of Patent: Jan. 10, 2023

(54) SIGNAL PROCESSING DEVICE, ELECTRONIC DEVICE, SIGNAL PROCESSING METHOD, AND PROGRAM

(71) Applicant: Sony Interactive Entertainment Inc., Tokyo (JP)

(72) Inventor: Yosuke Kurihara, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/296,777

(22) PCT Filed: Dec. 3, 2019

(86) PCT No.: PCT/JP2019/047132
§ 371 (c)(1),
(2) Date: May 25, 2021

(87) PCT Pub. No.: WO2020/116416
PCT Pub. Date: Jun. 11, 2020

(65) Prior Publication Data
US 2022/0030188 A1 Jan. 27, 2022

(30) Foreign Application Priority Data
Dec. 5, 2018 (JP) .............................. JP2018-227779

(51) Int. Cl.
*H04N 5/378* (2011.01)
*H04N 5/232* (2006.01)
*H04N 5/351* (2011.01)

(52) U.S. Cl.
CPC ......... *H04N 5/378* (2013.01); *H04N 5/23229* (2013.01); *H04N 5/351* (2013.01)

(58) Field of Classification Search
CPC .... H04N 5/378; H04N 5/23229; H04N 5/351; H04N 5/335; H04N 5/37452
See application file for complete search history.

(56) References Cited

U.S. PATENT DOCUMENTS

| 8,352,663 B2 | 1/2013 | Hirayama |
| 8,674,628 B2 | 3/2014 | Kim |

(Continued)

FOREIGN PATENT DOCUMENTS

| JP | 2005321933 A | * | 11/2005 | ........... G06F 3/0689 |
| JP | 2005321933 A | | 11/2005 | |

(Continued)

OTHER PUBLICATIONS

International Preliminary Report on Patentability and Written Opinion for corresponding PCT Application PCT/JP2019/047132, 14 pages, dated Jun. 17, 2021.

(Continued)

*Primary Examiner* — Nhan T Tran
(74) *Attorney, Agent, or Firm* — Matthew B. Dernier, Esq.

(57) ABSTRACT

Provided is a signal processing device including a communication unit which receives packets transmitted from an event-driven vision sensor including a sensor array including sensors generating event signals when a change in intensity of incident light is detected, a buffer memory in which the packets are temporarily stored, and a readout control unit which forcibly reads out the packets from the buffer memory in a case in which predetermined conditions are satisfied.

8 Claims, 6 Drawing Sheets

(56) References Cited

U.S. PATENT DOCUMENTS

| | | | | |
|---|---|---|---|---|
| 9,389,693 B2* | 7/2016 | Lee | ................ | G06V 40/28 |
| 2010/0023655 A1* | 1/2010 | Hirayama | ............. | G06F 3/0656 |
| | | | | 710/33 |
| 2012/0098446 A1 | 4/2012 | Kim | | |
| 2014/0320403 A1 | 10/2014 | Lee | | |
| 2018/0146149 A1* | 5/2018 | Suh | ................ | G01J 1/44 |
| 2018/0152644 A1 | 5/2018 | Kondo | | |
| 2018/0262705 A1* | 9/2018 | Park | ............ | G06F 16/2322 |

FOREIGN PATENT DOCUMENTS

| | | | | |
|---|---|---|---|---|
| JP | 2010033125 A | * | 2/2010 | ............ G06F 3/061 |
| JP | 2010033125 A | | 2/2010 | |
| JP | 2014535098 A | | 12/2014 | |
| JP | 2018085725 A | | 5/2018 | |
| KR | 20120108737 A | * | 10/2012 | ............ H05B 37/02 |
| KR | 1020120108737 A | | 10/2012 | |
| WO | 2017149433 A1 | | 9/2017 | |

OTHER PUBLICATIONS

International Search Report for corresponding PCT Application PCT/JP2019/047132, 4 pages, dated Mar. 3, 2020.
Notice of Preliminary Rejection for corresponding KR Application No. 10-2021-7016001, 8 pages, dated Jul. 5, 2022.
Notice of Reasons for refusal for corresponding JP Application 2018-227779, 8 pages, dated Apr. 1, 2022.
European Supplementary Search Report for corresponding EP Application No. 19893042.2, 17 pages, dated Aug. 4, 2022.

* cited by examiner

SIGNAL PROCESSING DEVICE, ELECTRONIC DEVICE, SIGNAL PROCESSING METHOD, AND PROGRAM

TECHNICAL FIELD

The present invention relates to a signal processing device, electronic equipment, a signal processing method, and a program.

BACKGROUND ART

An event-driven vision sensor in which a pixel that has detected a change in the intensity of incident light generates a signal asynchronously in time has been known. The event-driven vision sensor is advantageous in that a low-power and high-speed operation can be performed as compared to a frame-type vision sensor, specifically, an image sensor such as a CCD (Charge Coupled Device) or a CMOS (Complementary Metal Oxide Semiconductor) that scans all pixels in each predetermined cycle. Techniques related to such an event-driven vision sensor are described in, for example, PTL 1 and PTL 2.

As a method of transmitting an event signal generated by such an event-driven vision sensor, an AER (Address Event Representation) format has been known. In the AER format, for example, four pieces of data of an x coordinate and a y coordinate of a pixel in which an event has occurred, ON/OFF (polarity) of the event, and a time stamp are transferred.

CITATION LIST

Patent Literature

[PTL 1] JP 2014-535098T
[PTL 2] JP 2018-85725A

SUMMARY

Technical Problem

However, since signals are generated asynchronously in time in the event-driven vision sensor, an amount of data transmitted per time in the AER format varies, and thus, there has been a problem that the burst size of a buffer is not filled and a delay occurs in data processing.

Therefore, an object of the present invention is to provide a signal processing device, electronic equipment, a signal processing method, and a program capable of eliminating a processing delay of data output from an event-driven vision sensor.

Solution to Problem

According to one aspect of the present invention, provided is a signal processing device including a communication unit which receives packets transmitted from an event-driven vision sensor including a sensor array including sensors generating event signals when a change in intensity of incident light is detected, a buffer memory in which the packets are temporarily stored, and a readout control unit which forcibly reads out the packets from the buffer memory in a case in which predetermined conditions are satisfied.

According to another aspect of the present invention, electronic equipment including the above signal processing device is provided.

According to still another aspect of the present invention, provided is a signal processing method including a step of receiving packets transmitted from an event-driven vision sensor including a sensor array including sensors generating event signals when a change in intensity of incident light is detected, a step of temporarily storing the packets in a buffer memory, and a step of forcibly reading out the packets from the buffer memory in a case in which predetermined conditions are satisfied.

According to yet another aspect of the present invention, provided is a program which allows a processing circuit of a signal processing device to execute a step of temporarily storing packets, in a buffer memory, transmitted from an event-driven vision sensor including a sensor array including sensors generating event signals when a change in the intensity of incident light is detected, and a step of forcibly reading out the packets from the buffer memory in a case in which predetermined conditions are satisfied.

According to the above configuration, since the packets are forcibly read out from the buffer memory in a case in which the predetermined conditions are satisfied, it is possible to suppress the processing delay of the data output from the event-driven vision sensor.

DESCRIPTION OF EMBODIMENTS

Hereinafter, several embodiments of the present invention will be described in detail with reference to the accompanying drawings. Note that constitutional elements having substantially the same functional configurations are denoted by the same reference signs in the specification and the drawings, and the duplicated description thereof is omitted.

First Embodiment

Figure 1:
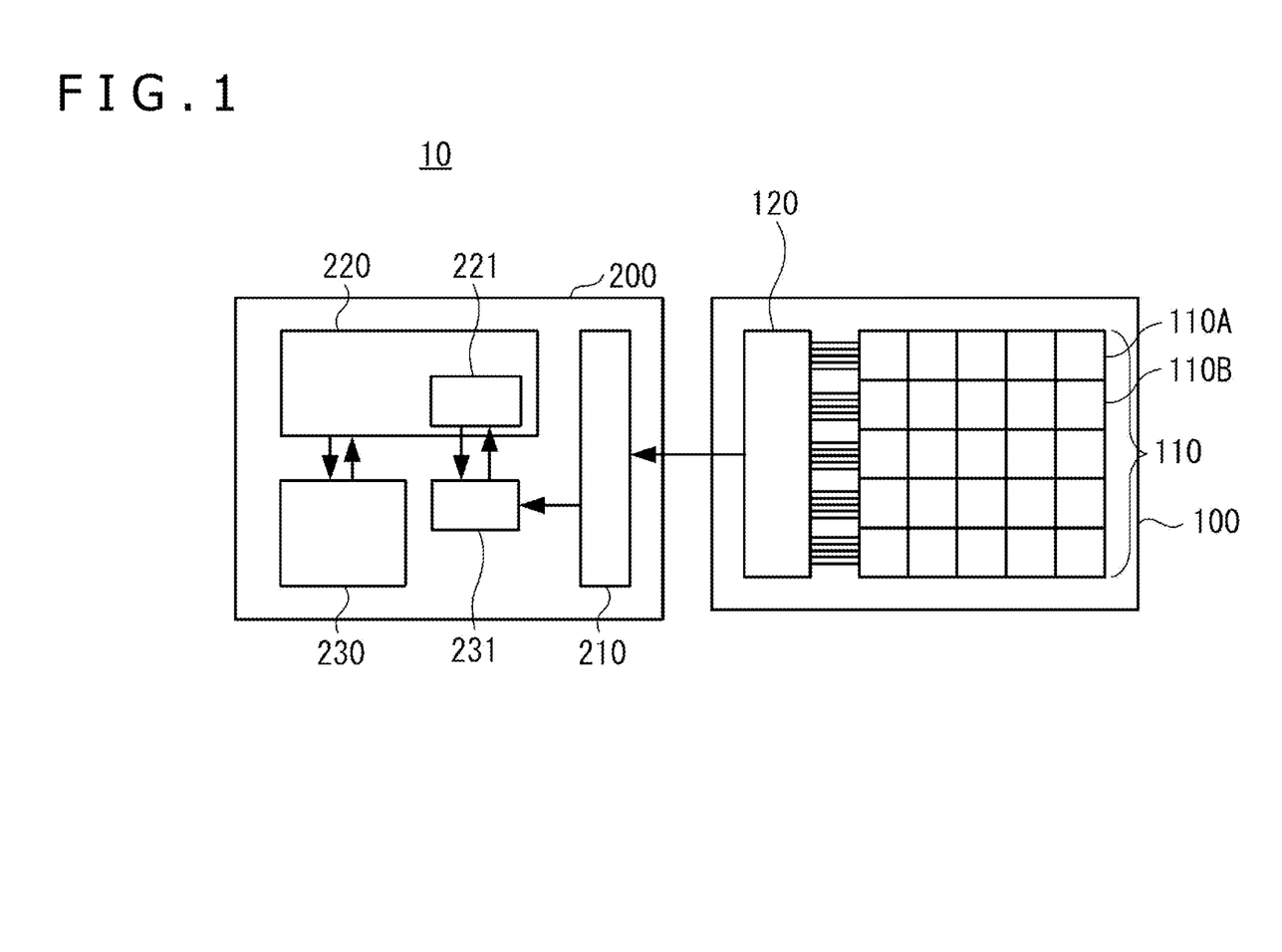
FIG. 1 is a block diagram illustrating a schematic configuration of electronic equipment according to a first embodiment of the present invention.

FIG. 1 is a block diagram illustrating a schematic configuration of electronic equipment according to a first embodiment of the present invention. As illustrated in FIG. 1, electronic equipment 10 includes an event-driven vision sensor 100 and a control unit 200.

The vision sensor 100 includes a sensor array 110 including sensors 110A, 110B, and the like corresponding to pixels of an image, and a processing circuit 120 connected to the sensor array 110. The sensors 110A, 110B, and the like include light receiving elements, and generate event signals when detecting a change in the intensity of incident light, more specifically, a change in luminance. The event signal is output from the processing circuit 120 as information indicating, for example, a time stamp, identification information (for example, the position of the pixel) of the sensor, and the polarity (increase or decrease) of a change in luminance. As will be described later, the processing circuit 120 adds a transfer end packet to the packets of the event signals. When a subject moves within the angle of view of the sensor array 110, the intensity of light reflected or scattered by the subject changes, and thus, the movement of the subject can be detected in time series by the event signals generated by the sensors 110A, 110B, and the like corresponding to, for example, the edge of the subject.

The control unit 200 includes a communication interface 210, a processing circuit 220, and a memory 230. The communication interface 210 receives packets transmitted from the processing circuit 120 of the vision sensor 100. The packets are temporarily stored in a buffer memory 231. The processing circuit 220 operates in accordance with, for example, a program stored in the memory 230, and processes packets read out from the buffer memory 231. For example, the processing circuit 220 generates an image in which the positions where changes in luminance have occurred are mapped in time series on the basis of the event signals included in the packets, and temporarily or continuously stores the image in the memory 230 or further transmits the image to another device via the communication interface 210. Here, the processing circuit 220 includes a readout control unit 221 that forcibly reads out the packets from the buffer memory 231 when predetermined conditions are satisfied.

Figure 2A:
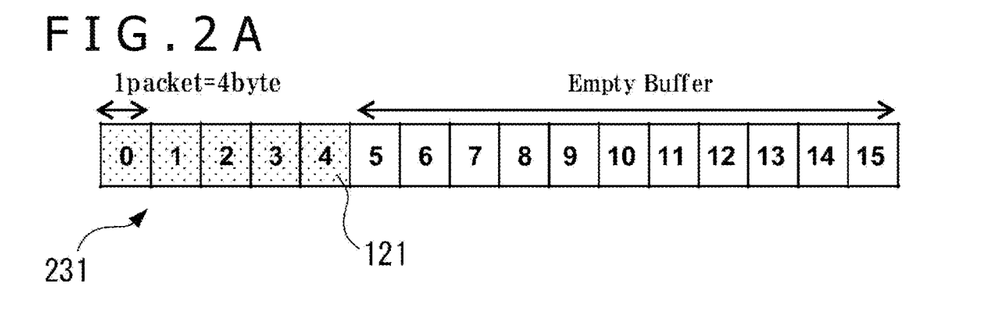
FIG. 2A is a diagram for conceptually describing a transfer end packet in the first embodiment of the present invention.
Figure 2B:
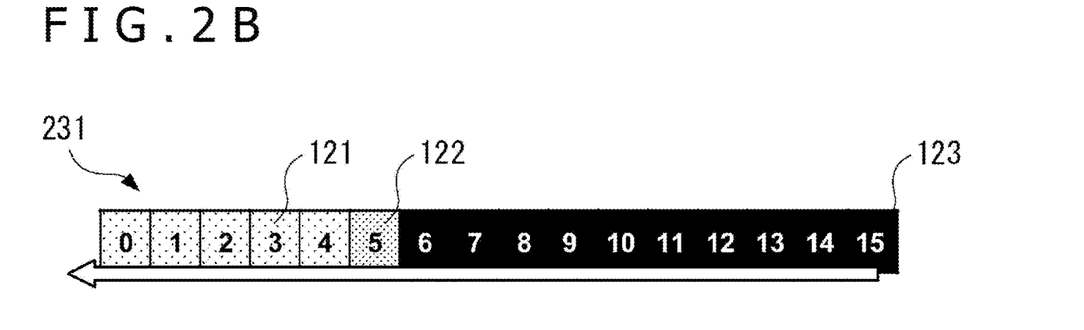
FIG. 2B is a diagram for conceptually describing the transfer end packet in the first embodiment of the present invention.
Figure 2C:
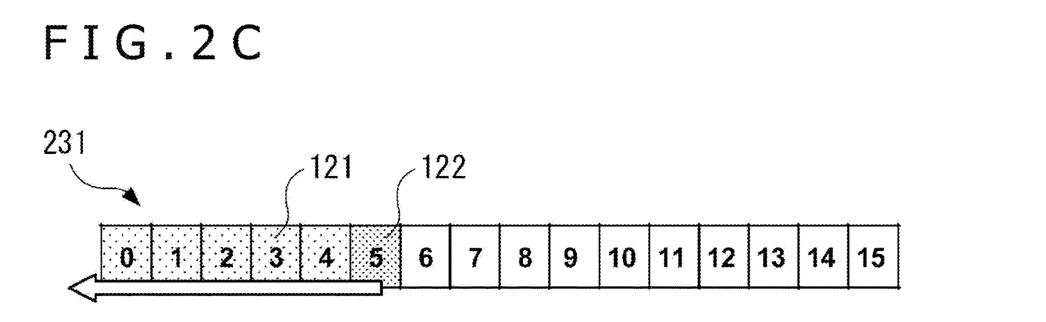
FIG. 2C is a diagram for conceptually describing the transfer end packet in the first embodiment of the present invention.

FIG. 2A to FIG. 2C are diagrams each conceptually describing the transfer end packet in the first embodiment of the present invention. In the examples illustrated in FIG. 2A to FIG. 2C, the minimum unit (one packet) of the event signal output from the vision sensor 100 is four bytes, a the size of the buffer memory 231 in the control unit 200 is 64 bytes (corresponding to 16 packets).

In the example illustrated in FIG. 2A, the readout control unit 221 is configured to read out packets 121 from the buffer memory 231 when the capacity of the buffer memory 231 becomes full. Here, in a case in which the number of events detected by the sensor array 110 is small and the vision sensor 100 outputs only the event signals corresponding to five packets, that is, 20 bytes, the capacity of the buffer memory 231 is still available. Therefore, the readout control unit 221 does not read out the packets 121 from the buffer memory 231. This situation continues until the capacity of the buffer memory 231 becomes full due to the event signals received thereafter or until the packets 121 are forcibly read out from the buffer memory 231 due to timeout. Accordingly, there is a possibility that a delay occurs between the generation of the event signal by the vision sensor 100 and the processing of the event signal by the processing circuit 220.

The situation as described above occurs because the event signal is generated asynchronously in time in the event-driven vision sensor 100. Among the sensors 110A, 110B, and the like configuring the sensor array 110 in the vision sensor 100, only the sensor that has detected a change in luminance generates the event signal, and the sensor that has not detected a change in luminance does not generate the event signal, so that a low-power and high-speed operation can be performed as compared to a frame-type vision sensor. In contrast, in the vision sensor 100, the amount of data transmitted per time varies, unlike the frame-type vision sensor which transmits data corresponding to all the pixels at the time of scanning, and accordingly, there is a possibility that the delay as described above may occur.

Thus, the processing circuit 120 in the vision sensor 100 adds a transfer end packet 122 to the packets 121 of the event signals in the embodiment as in the examples illustrated in FIG. 2B and FIG. 2C. More specifically, when scanning of the sensors 110A, 110B, and the like is completed, the processing circuit 120 adds the transfer end packet 122 to the packets 121 of the event signals. In this case, when the transfer end packet 122 is stored in the buffer memory 231, the readout control unit 221 forcibly reads out the packets 121 from the buffer memory 231 irrespective of the free capacity of the buffer memory 231. In the example illustrated in FIG. 2B, when finding the transfer end packet 122, the readout control unit 221 stores padding data 123 in the free capacity of the buffer memory 231 to fill up the capacity of the buffer memory 231, and the packets 121 are accordingly sent to the process in the processing circuit 220. In addition, in the example illustrated in FIG. 2C, when finding the transfer end packet 122, the readout control unit 221 may be also configured to forcibly read out the packets 121 from the buffer memory 231 without padding and send the packets to the process in the processing circuit 220.

Figure 3:
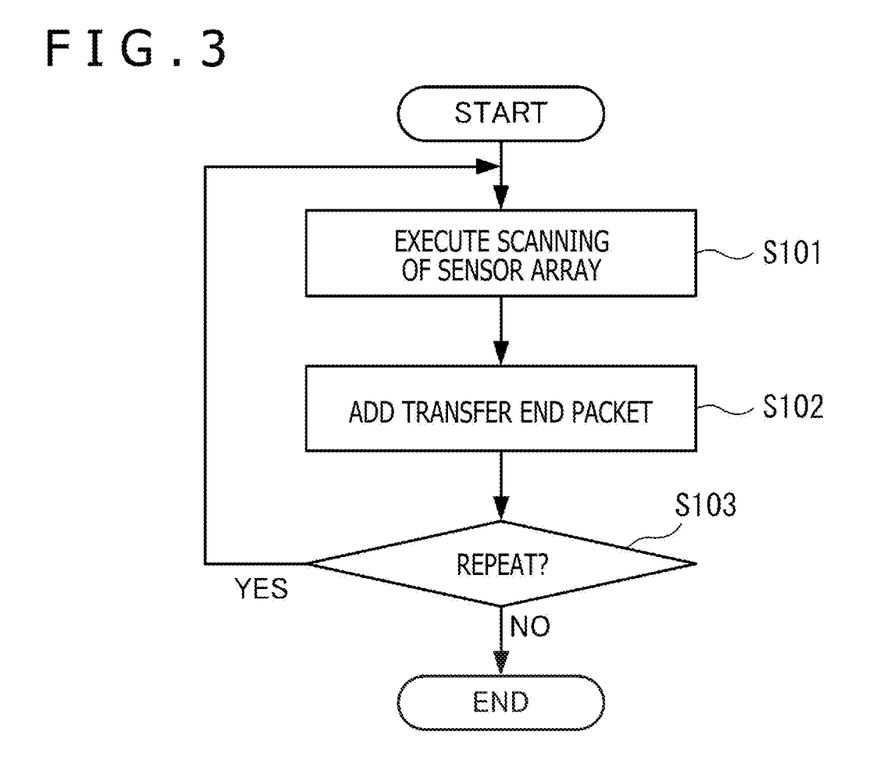
FIG. 3 is a flowchart illustrating an example of a process of a processing circuit of a vision sensor in the first embodiment of the present invention.

FIG. 3 is a flowchart illustrating an example of a process of the processing circuit of the vision sensor in the first embodiment of the present invention. In the illustrated example, the processing circuit 120 executes scanning of the sensor array 110 (Step S101). Here, the scanning of the sensor array 110 is executed by scanning the sensors 110A, 110B, and the like in a predetermined order and acquiring the event signal only from the sensor that has detected a change in luminance. For example, although scanning is executed in the same manner even in the frame-type vision sensor, the scanning of the event-driven vision sensor 100 is executed at a higher speed because a process for the sensor that has not detected a change in luminance is skipped. When the scanning in Step S101 is completed, the processing circuit 120 adds the transfer end packet to the packets of the event signals (Step S102). The processing circuit 120 repeats these processes (Step S103).

Figure 4:
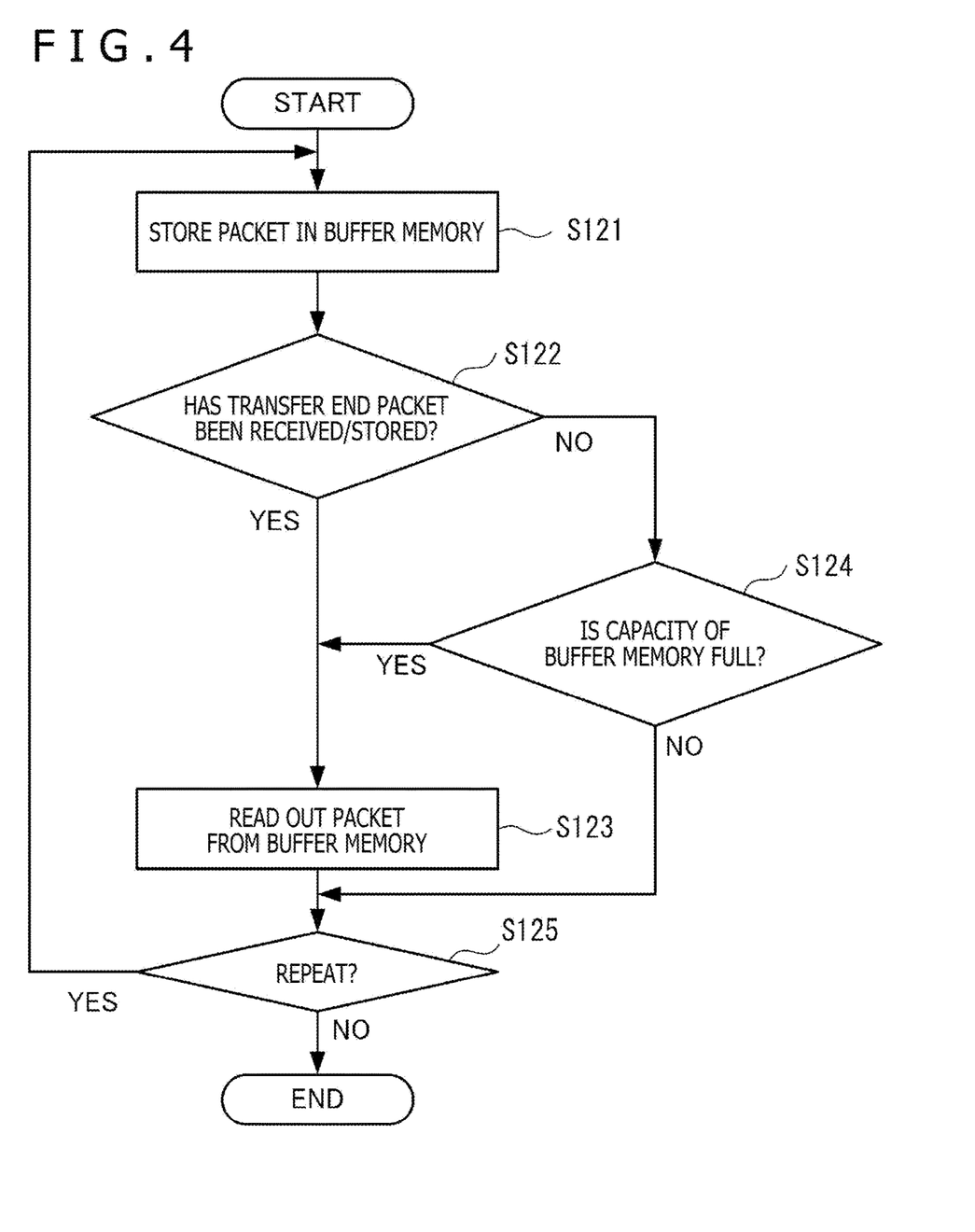
FIG. 4 is a flowchart illustrating an example of a process of a readout control unit in the first embodiment of the present invention.

FIG. 4 is a flowchart illustrating an example of a process of the readout control unit in the first embodiment of the present invention. In the illustrated example, the readout control unit 221 stores the packets of the event signals received from the vision sensor 100 in the buffer memory 231 (Step S121). The readout control unit 221 monitors the packets of the event signals stored in the buffer memory 231, and in a case in which the transfer end packet 122 is received or stored (Step S122), the packets 121 are read out from the buffer memory 231 (Step S123). Even in a case in which the capacity of the buffer memory 231 becomes full (Step S124), the readout control unit 221 reads out the packets 121 from the buffer memory 231 (Step S123). The readout control unit 221 repeats these processes (Step S125).

In the above example, in a case in which the number of events detected by the sensor array 110 is large and the packets 121 to be transmitted exceed the capacity of the buffer memory 231, the packets 121 are sequentially read out from the buffer memory 231 by the process in Step S105 described above. If the transfer efficiency in a case in which the transmission amount is large as described above is considered, it is preferable that the capacity of the buffer memory 231 is large to some extent. In the embodiment, in a case in which the number of event signals output from the vision sensor 100 is small, the forcible readout is executed by the transfer end packet 122 as described above, so that the processing delay of the event signals in the control unit 200 can be suppressed to a time corresponding to one scan of the sensor array 110 at most while securing the capacity of the buffer memory 231.

Second Embodiment

Next, a second embodiment of the present invention will be described. In the second embodiment, the processing circuit 120 of the vision sensor 100 adds a transfer start packet to the packets of the event signals in the same configuration of the electronic equipment as the above-described first embodiment. The process of the processing circuit 120 in the embodiment may be a process in which the order of Step S101 and Step S102 is switched, and the transfer end packet is replaced with the transfer start packet in, for example, the example described above by using FIG. 3. In other respects, the configuration of the embodiment is the same as that of the above-described first embodiment, and thus, the duplicated and detailed description thereof is omitted.

Figure 5A:
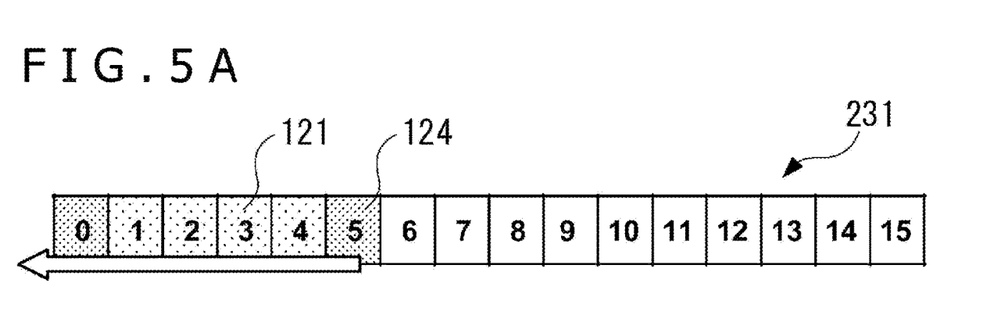
FIG. 5A is a diagram for conceptually describing a transfer start packet in a second embodiment of the present invention.
Figure 5B:
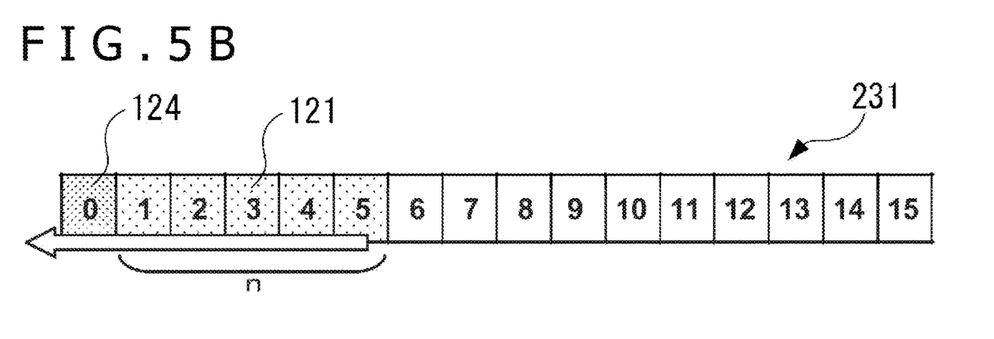
FIG. 5B is a diagram for conceptually describing the transfer start packet in the second embodiment of the present invention.

FIG. 5A and FIG. 5B are diagrams each conceptually describing the transfer start packet in the second embodiment of the present invention. In the examples illustrated in FIG. 5A and FIG. 5B, the buffer memory 231 is configured in the same manner as the examples described above with reference to FIG. 2A to FIG. 2C. Note that a case in which the transfer start packet is not received is the same as the example described with reference to FIG. 2A, and is accordingly omitted.

In the example illustrated in FIG. 5A, when a transfer start packet 124 is newly received, the readout control unit 221 forcibly reads out the packets 121 of the event signals stored in the buffer memory 121 at that time, and sends the packets 121 to the process in the processing circuit 220. The readout control unit 221 may perform the padding as in the example illustrated in FIG. 2B. In this case, the processing delay of the event signals in the control unit 200 is suppressed to a time corresponding to one scan of the sensor array 110 at most.

Meanwhile, in the example illustrated in FIG. 5B, when the number of packets 121 of the event signals stored in the buffer memory 231 reaches a predetermined number n counted from the transfer start packet 124, the readout control unit 221 forcibly reads out the packets 121 of the event signals stored in the buffer memory 231 at that time, and sends the packets to the process in the processing circuit 220. For example, the predetermined number n can be statistically determined as the mean value or the maximum value of the numbers of event signals output in one scan of the sensor array 110.

Also in the embodiment, the processing delay of the event signals in the control unit 200 can be suppressed while securing the capacity of the buffer memory 231 as similar to the above-described first embodiment. In addition, the embodiment can be also applied to, for example, a case in which the end of scanning is not specified in the processing circuit 120 because the event signals generated by the vision sensor 100 is asynchronous in time.

In the above-described first and second embodiments of the present invention, the processing circuit 120 of the vision sensor 100 adds a delimiter (separator) packet such as the transfer end packet 122 or the transfer start packet 124 to the packets corresponding to the event signals, so that the processing delay of the event signals is prevented. Note that the processing circuit 120 does not necessarily execute the scanning of the sensor array 110 as described above. In this case, for example, the processing circuit 120 transmits the delimiter packet to the control unit 200 in each predetermined time cycle, and the readout control unit 221 handles the delimiter packet in the same manner as the transfer end packet 122 and the transfer start packet 124 in the above example, so that the processing delay of the event signals can be prevented.

Third Embodiment

Next, a third embodiment of the present invention will be described. In the third embodiment, in the same configuration of the electronic equipment as the above-described first embodiment, the processing circuit 120 of the vision sensor 100 does not add the delimiter packet to the packets of the event signals, and the readout control unit 221 of the control unit 200 forcibly reads out the packets 121 of the event signals stored in the buffer memory 231 in accordance with predetermined conditions, so that the processing delay of the event signals can be prevented. In other respects, the configuration of the present embodiment is the same as that of the above-described first embodiment, and thus, the duplicated and detailed description thereof is omitted.

Figure 6:
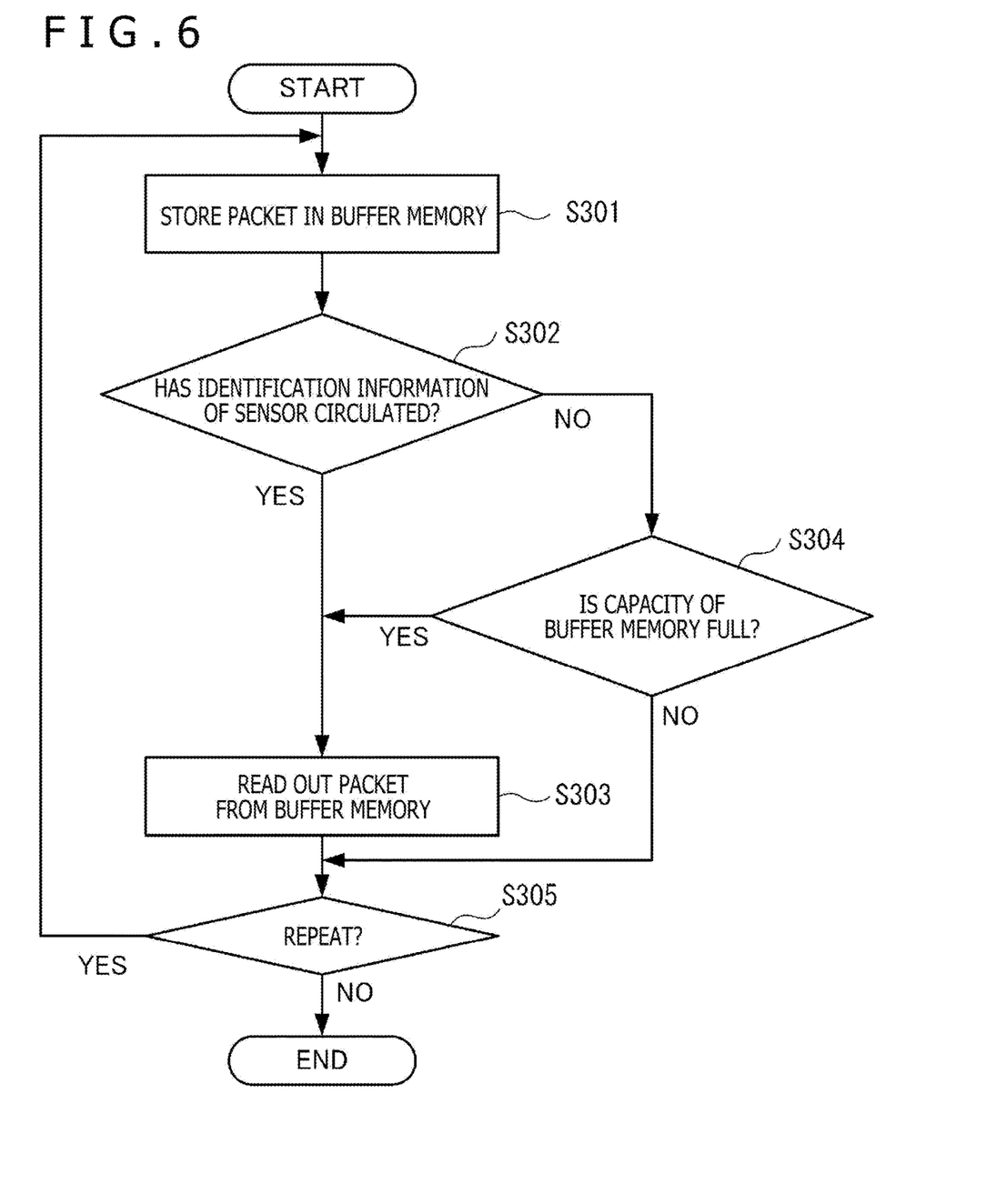
FIG. 6 is a flowchart illustrating an example of a process of a readout control unit in a third embodiment of the present invention.

FIG. 6 is a flowchart illustrating an example of a process of the readout control unit in the third embodiment of the present invention. In the illustrated example, the readout control unit 221 stores the packets of the event signals received from the vision sensor 100 in the buffer memory 231 (Step S301). The readout control unit 221 monitors the packets of the event signals stored in the buffer memory 231, and in a case in which the identification information (for example, the position of the pixel) of the sensor indicated by the event signal circulates (Step S302), the packets 121 are read out from the buffer memory 231 (Step S303). Even in a case in which the capacity of the buffer memory 231 becomes full (Step S304), the readout control unit 221 reads out the packets 121 from the buffer memory 231 (Step S303). The readout control unit 221 repeats these processes (Step S305).

In the above example, the readout control unit 221 forcibly reads out the packets 121 from the buffer memory 231 on condition that the identification information of the sensor indicated by the event signal circulates. Specifically, for example, in a case in which the identification information is a coordinate (x, y) indicating the position of the pixel corresponding to the sensor, the readout control unit 221 may determine that the identification information circulates on condition that $x_2 < x_1$ or $x_2 = x_1$ and $y_2 < y_1$ between a coordinate $(x_1, y_1)$ associated with a time stamp $t_1$ and a coordinate $(x_2, y_2)$ associated with a time stamp $t_2$ ($t_2 > t_1$). Alternatively, the readout control unit 221 may determine that the identification information circulates in a case in which an event signal indicating the same identification information associated with a different time stamp is received.

Even in the present embodiment, the processing delay of the event signals in the control unit 200 can be suppressed while securing the capacity of the buffer memory 231 as similar to the above-described first embodiment and second embodiment. In addition, the present embodiment can be also applied to, for example, a case in which it is not easy to implement the function of adding the delimiter packet to the event signals in the processing circuit 120.

Although several embodiments of the present invention have been described above in detail with reference to the accompanying drawings, the present invention is not limited to the examples. It is clear that a person ordinarily skilled in the art to which the present invention belongs can perceive various change examples and modification examples within the scope of the technical idea described in the claims, and it can be understood that these obviously belong to the technical range of the present invention.

REFERENCE SIGNS LIST

10: Electronic device
100: Vision sensor
110: Sensor array
110A, 110B: Sensor
120: Processing circuit
121: Packet
122: Transfer end packet
123: Padding data
124: Transfer start packet
200: Control unit
210: Communication interface
220: Processing circuit
221: Readout control unit
230: Memory
231: Buffer memory

The invention claimed is:

1. A signal processing device comprising:
a communication unit which receives packets transmitted from an event-driven vision sensor including a sensor array including sensors generating event signals when a change in intensity of incident light is detected;
a buffer memory in which the packets are temporarily stored; and
a readout control unit which forcibly reads out the packets from the buffer memory in a case in which predetermined conditions are satisfied,
wherein the packets include packets corresponding to the event signals and a delimiter packet added to the packets corresponding to the event signals in the vision sensor, and
the readout control unit determines the predetermined conditions in accordance with the delimiter packet.

2. The signal processing device according to claim 1, wherein the predetermined conditions include whether the delimiter packet is received by the communication unit or stored in the buffer memory.

3. The signal processing device according to claim 1, wherein the predetermined conditions include that the delimiter packet is stored in the buffer memory and that the number of packets counted from the delimiter packet reaches a predetermined number.

4. A signal processing device comprising:
a communication unit which receives packets transmitted from an event-driven vision sensor including a sensor array including sensors for generating event signals when a change in the intensity of incident light is detected;
a buffer memory in which the packets are temporarily stored; and
a readout control unit which forcibly reads out the packets from the buffer memory in a case in which predetermined conditions are satisfied,
wherein the packets include packets corresponding to the event signals,
each event signal includes a time stamp and identification information of the sensor,
the readout control unit determines the predetermined conditions by monitoring the identification information associated with a different time stamp, and
the predetermined conditions include that the identification information of the sensor circulates with respect to at least one of the time stamp and the different time stamp.

5. A signal processing method comprising:
receiving packets transmitted from an event-driven vision sensor including a sensor array including sensors generating event signals when a change in intensity of incident light is detected;
temporarily storing the packets in a buffer memory; and
forcibly reading out the packets from the buffer memory in a case in which predetermined conditions are satisfied, wherein
the packets include packets corresponding to the event signals and a delimiter packet added to the packets corresponding to the event signals in the vision sensor, and
in the reading out packets, the predetermined conditions are determined in accordance with the delimiter packet.

6. A non-transitory, computer readable storage medium containing a computer program which, when executed by a computer, allows a processing circuit of a signal processing device to carry out actions, comprising:
temporarily storing packets transmitted from an event-driven vision sensor including a sensor array including sensors generating event signals when a change in intensity of incident light is detected in a buffer memory; and
forcibly reading out the packets from the buffer memory in a case in which predetermined conditions are satisfied,
wherein the packets include packets corresponding to the event signals and a delimiter packet added to the packets corresponding to the event signals in the vision sensor, and
in the reading out packets, the predetermined conditions are determined in accordance with the delimiter packet.

7. A signal processing method comprising:
receiving packets transmitted from an event-driven vision sensor including a sensor array including sensors generating event signals when a change in intensity of incident light is detected;
temporarily storing the packets in a buffer memory; and
forcibly reading out the packets from the buffer memory in a case in which predetermined conditions are satisfied,
wherein the packets include packets corresponding to the event signals,
each event signal includes a time stamp and identification information of the sensor,
in the reading out the packets, the predetermined conditions are determined by monitoring the identification information associated with a different time stamp, and
the predetermined conditions include that the identification information of the sensor circulates with respect to at least one of the time stamp and the different time stamp.

8. A non-transitory, computer readable storage medium containing a computer program which, when executed by a computer, allows a processing circuit of a signal processing device to carry out actions, comprising:
- temporarily storing packets transmitted from an event-driven vision sensor including a sensor array including sensors generating event signals when a change in intensity of incident light is detected in a buffer memory; and
- forcibly reading out the packets from the buffer memory in a case in which predetermined conditions are satisfied,
- wherein the packets include packets corresponding to the event signals,
- each event signal includes a time stamp and identification information of the sensor,
- in the reading out the packets, the predetermined conditions are determined by monitoring the identification information associated with a different time stamp, and
- the predetermined conditions include that the identification information of the sensor circulates with respect to at least one of the time stamp and the different time stamp.

\* \* \* \* \*